United States Patent
Chauveau

(10) Patent No.: US 10,359,628 B2
(45) Date of Patent: Jul. 23, 2019

(54) BEAM-SPLITTER WITH AN ANGLED REAR SURFACE

(71) Applicant: VISTEON GLOBAL TECHNOLOGIES, INC., Van Buren Township, MI (US)

(72) Inventor: Benoit Chauveau, Van Buren Township, MI (US)

(73) Assignee: Visteon Global Technologies, INC., Van Buren Township, MI (US)

( * ) Notice: Subject to any disclaimer, the term of this patent is extended or adjusted under 35 U.S.C. 154(b) by 0 days.

(21) Appl. No.: 15/664,900

(22) Filed: Jul. 31, 2017

(65) Prior Publication Data

US 2019/0033583 A1    Jan. 31, 2019

(51) Int. Cl.
*G02B 27/14* (2006.01)
*G02B 27/01* (2006.01)

(52) U.S. Cl.
CPC ....... *G02B 27/0101* (2013.01); *G02B 27/142* (2013.01); *G02B 2027/012* (2013.01); *G02B 2027/0194* (2013.01)

(58) Field of Classification Search
CPC .................................................. G02B 27/0101
USPC .......................................................... 359/630
See application file for complete search history.

(56) References Cited

U.S. PATENT DOCUMENTS

| 8,867,131 | B1 | 10/2014 | Amirparviz |
| 9,244,275 | B1 | 1/2016 | Li |
| 2006/0262406 | A1 | 11/2006 | Wang |
| 2011/0007323 | A1 | 1/2011 | De Groot et al. |
| 2012/0224062 | A1 | 9/2012 | Lacoste et al. |
| 2017/0269361 | A1* | 9/2017 | Xu ................... B60K 35/00 |

* cited by examiner

*Primary Examiner* — James C. Jones
(74) *Attorney, Agent, or Firm* — Quinn IP Law

(57) ABSTRACT

Disclosed herein are devices, methods and systems for implementing a beam-splitter with the deleterious effects of double images removed. The aspects disclosed herein are implemented with the introduction of a front and rear surface of the beam-splitter's transparent substrate being in a non-parallel fashion. The aspects disclosed herein may be employed with a head-up display (HUD), an augment reality (AR) HUD, or any implementation employing at least two picture generation units.

5 Claims, 10 Drawing Sheets

BEAM-SPLITTER WITH AN ANGLED REAR SURFACE

BACKGROUND

Electronic displays are provided in many contexts to electronically render digital information to a viewer. The electronic displays receive information, and render the information through lighted cells in patterns that reflect the texts and pictures employed to convey the information.

A Head-Up Display (HUD) allows a viewer to view not only the lighted information, but due to the transparent nature of the HUD, the view through the HUD. Thus, a viewer may be delivered information while not losing the ability to view the real world through the HUD.

HUDs are implemented in a variety of contexts, and more commonly in the vehicle. The HUD may be implemented in a variety of surfaces and windows, for example, the front windshield. Thus, when a driver/occupant is in a vehicle, content may be displayed to the driver/occupant on the front windshield accordingly.

While a conventional HUD (simply called HUD) features a virtual image displayed at a close distance to the driver and display car related information such like speed, speed limit and icons, an augmented reality (AR) HUD features others virtual images which are then perceived as within the scene the user is seeing. It is thus possible to build a system combining both close and far virtual images which from multiple light generating sources on a single HUD display. With such system, primary content may be generated from a first source, and secondary content (used for augmented reality, that is to say to augment the real-world) may be generated from a second source.

FIG. 1 illustrates an AR HUD implementation 100, employed in a front portion of a vehicle cockpit. As shown, a viewer 150 gazes via the viewer 150's eyes 151 through a front windshield 110. Employing the capabilities of such an AR HUD, the viewer 150 is able to see two distinct virtual images, virtual image 101 and virtual image 102. Virtual image 101 may be employed to present a static set of information, for example, real-time and dynamic updates with various vehicular operations. Virtual image 102 may be employed to augment objects visible through the front windshield 110.

FIGS. 2-4 illustrate various system-level views of AR HUD implementations employing a beam splitter. Each of the AR HUDs shown implements a different beam splitter.

Referring to FIG. 2, a system-level implementation of an AR HUD 200 is shown. Referring to the system-level implementation, a first picture generating unit (PGU) 210 and a second PGU 220 are shown. A PGU may be any sort of image display source capable of generating a source image to ultimately be displayed via the AR HUD 200. For example, the PGU may be a semiconductor-based display, such a liquid crystal display (LCD) or organic light emitting display (OLED), receiving an image or instructions to render a lighted image from a microprocessor or programmable logic device.

As shown in FIG. 2, a source image is projected from the PGU 210 to a mirror 230, which reflects the source image to a beam-splitter 240. After which, the source image from the PGU 210 is reflected from the beam-splitter 240 to a mirror 250, which is then projected onto the front windshield 100, to be rendered viewable by a viewer 150's eyes 151.

Also shown in FIG. 2 is an optical path generated through a PGU 220. This optical path 220 is projected through the beam-splitter 240, reflected off mirror 250, and projected to front windshield 100, and shown to the viewer 150's eyes 151. The concept shown in FIG. 2 employs a beam-splitter 240.

FIG. 5 illustrates how a beam-splitter works through exemplary beam-splitter 500. As shown, light 510 and 520 each are reflected off a surface of the beam-splitter 500. As shown in FIG. 5, source light 510 divides into two light beams 511 and 512, and source light 520 divides into two light beams 521 and 522. Thus, employing a beam-splitter 240 in an AR HUD 200 allows two distinct images to be combined together.

FIG. 3 illustrates another system-level implementation of an AR HUD 300. As shown, the difference between AR HUD 300 and AR HUD 200 is the employment of beam splitter 310. FIG. 6(a) illustrates a side-view of the beam-splitter 310, illustrating each individual element employed to construct beam-splitter 310.

As shown, beam-splitter 310 includes two layers, a reflective coating 610 and a transparent substrate (either glass or plastic) 620. The provision of the reflective coating allows the reflectivity of the beam-splitter 310 to be improved, thereby allowing light 601 to be effectively reflected off the surface of reflective coating 610.

However, both of AR HUDs 200 and 300 facilitate light from PGU 220 reflecting backwards, and thus, interfering with a signal being employed to project onto a windshield surface. FIG. 4 illustrates another system-level implementation of an AR HUD 400. As shown, the difference between AR HUD 400 with AR HUDs 200 and 300 is the employment of beam splitter 410. FIG. 6(b) illustrates a side-view of the beam-splitter 410, illustrating each individual layer employed to construct beam-splitter 310. As shown, an anti-reflective coating layer 630 is provided on the rear surface of the transparent substrate 620. Thus, light projected via light path 602 is prevented from reflecting back to an originating source, and thus interfering with the light generation associated with projecting light path 602.

SUMMARY

The following description relates to providing a system, method, and device for a beam-splitter designed to abate parasitic reflectance. Exemplary embodiments may also be directed to any of the system, the method, or an application disclosed herein, and the subsequent implementation in a HUD, AR HUD, or a vehicle-display HUD implementation.

The aspects disclosed herein are directed to a beam-splitter for a HUD. The beam-splitter includes a transparent substrate defined by a first surface and a second surface, the first surface the second surface opposing each other; and a reflective coating applied to the first surface, wherein the first surface and the second surface are not parallel to each other.

In another embodiment, the aspects disclosed herein are directed to a beam-splitter in which the transparent substrate is glass.

In another embodiment, the aspects disclosed herein are directed to a beam-splitter in which the transparent substrate is plastic.

In another embodiment, the aspects disclosed herein are directed to a beam-splitter in which the second surface forms an acute angle with a third surface, the third surface being in-between and extending perpendicular to both the first and second surface.

In another embodiment, the aspects disclosed herein are directed to a beam-splitter in which the beam-splitter consists of the transparent substrate and the reflective coating.

The aspects disclosed herein are related to a HUD including the disclosed beam-splitter.

The aspects disclosed herein are related to a method for implementing a beam-splitter. The method includes the following steps: providing a transparent substrate with a first surface and a second surface not parallel to each other; and providing a reflective coating on the first surface.

Additional features of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which.

DETAILED DESCRIPTION

Figure 1:
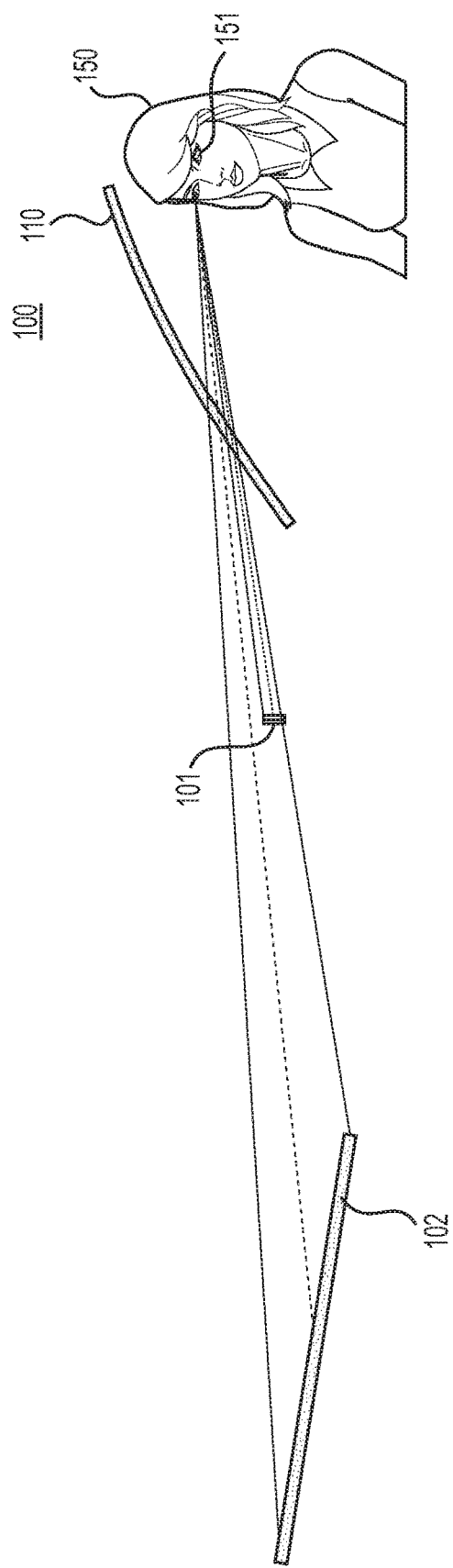
FIG. 1 illustrates an example of an augment reality (AR) head-up display (HUD)

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Dual image HUD systems like the one described above employ beam-splitter technology to allow light from a first source to be combined with reflected light from a second source. This effectively allows a HUD to implement multiple virtual images on a display, and viewable by a viewer.

Thus, an implementer may effectively employ a first PGU to present content related to one topic (for example, vehicle-generated information sourced from a vehicle sensor), and employ a second PGU to serve as providing augmented content associated with a real-world objects and/or scenarios.

Figure 2:
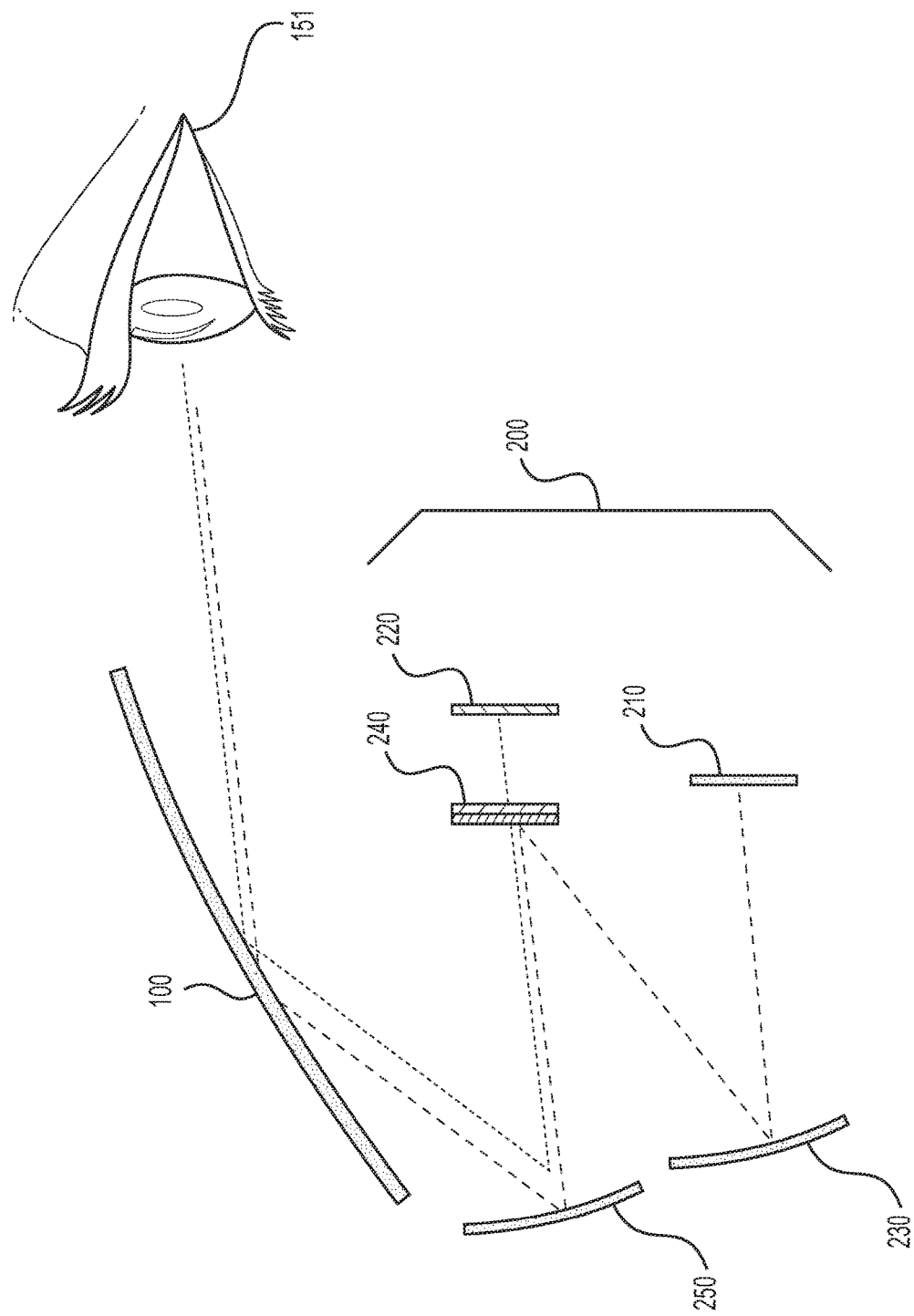
FIGS. 2-4 illustrate system-level implementations of AR HUD systems.
Figure 3:
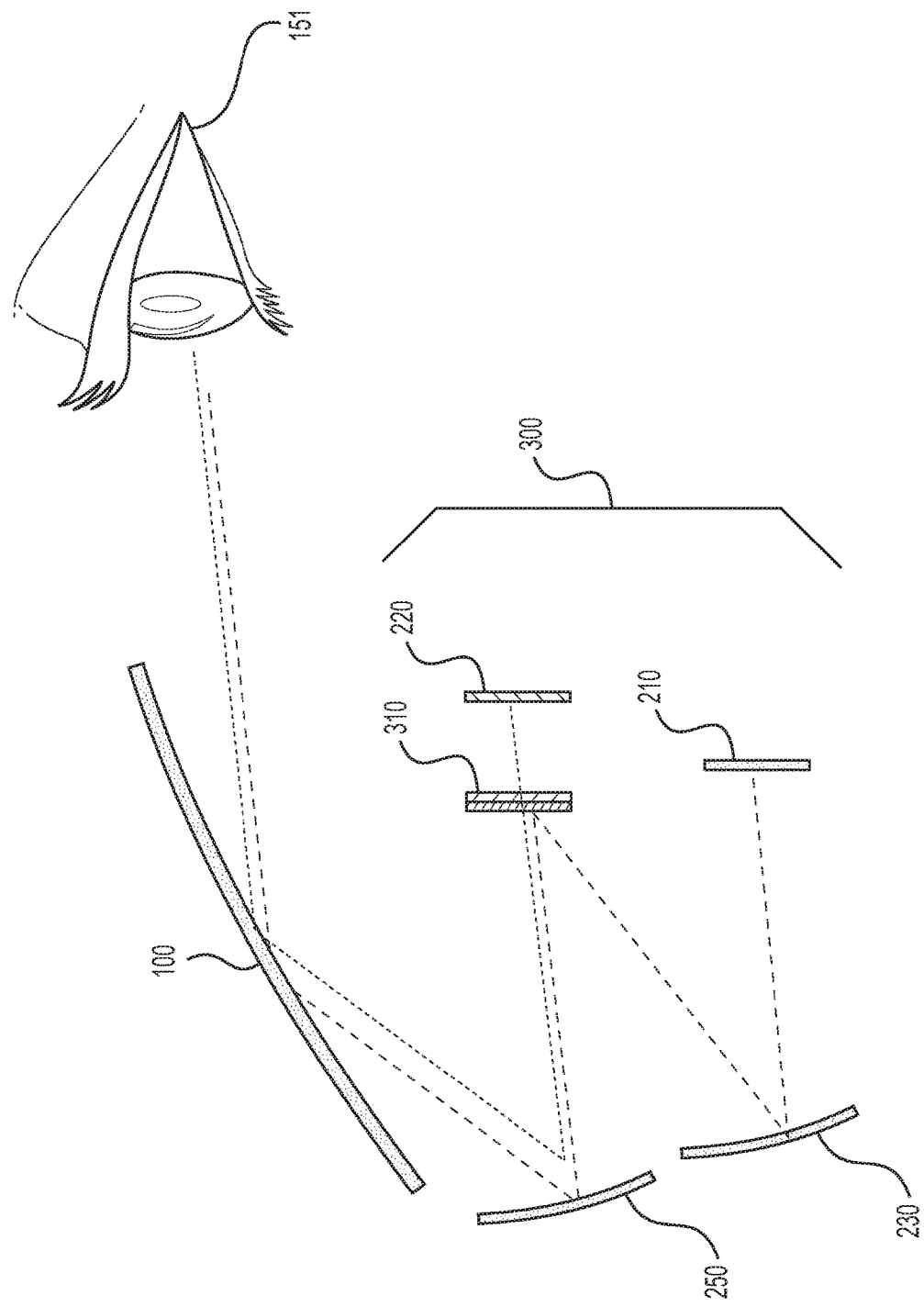
Figure 4:
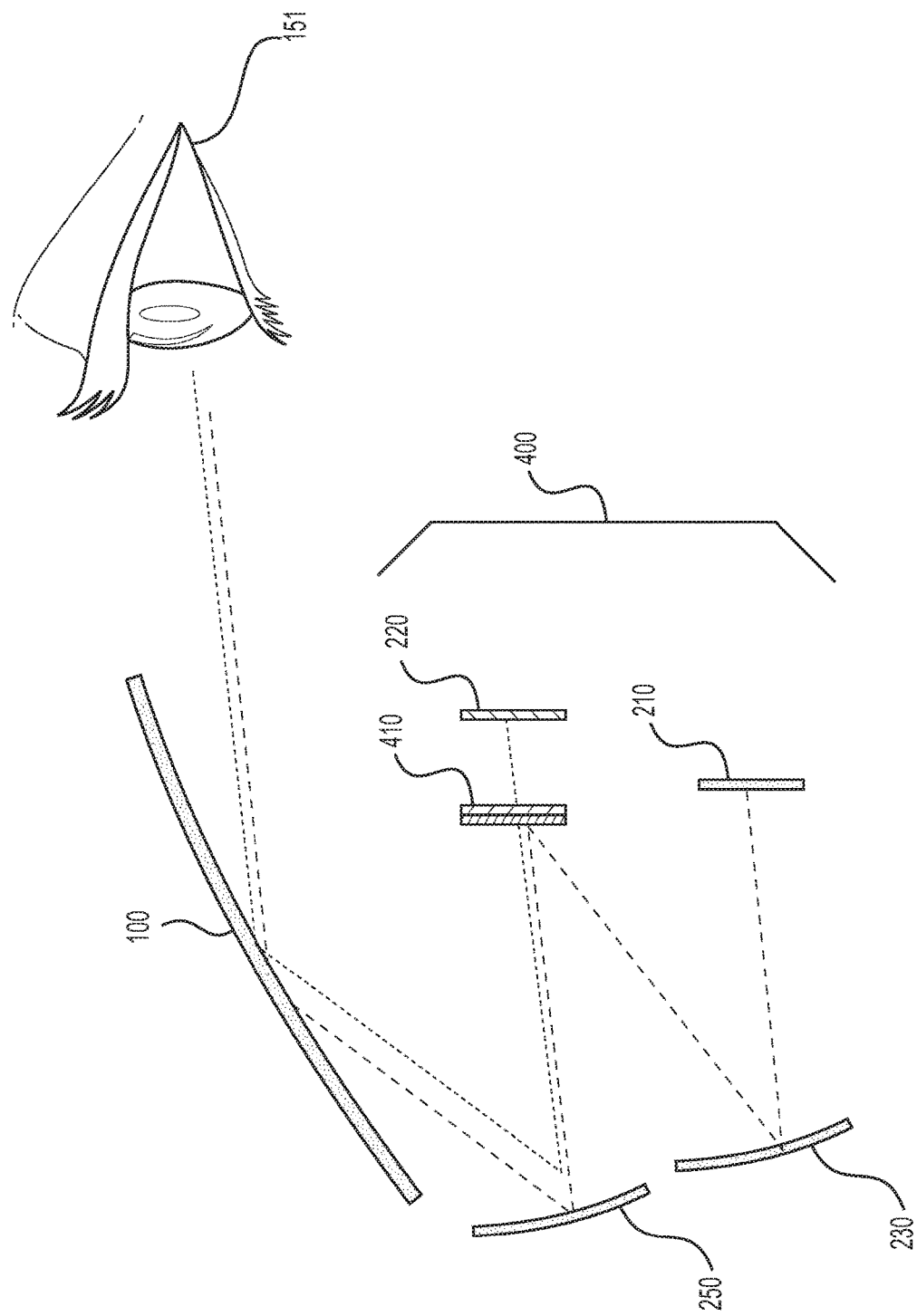
Figure 5:
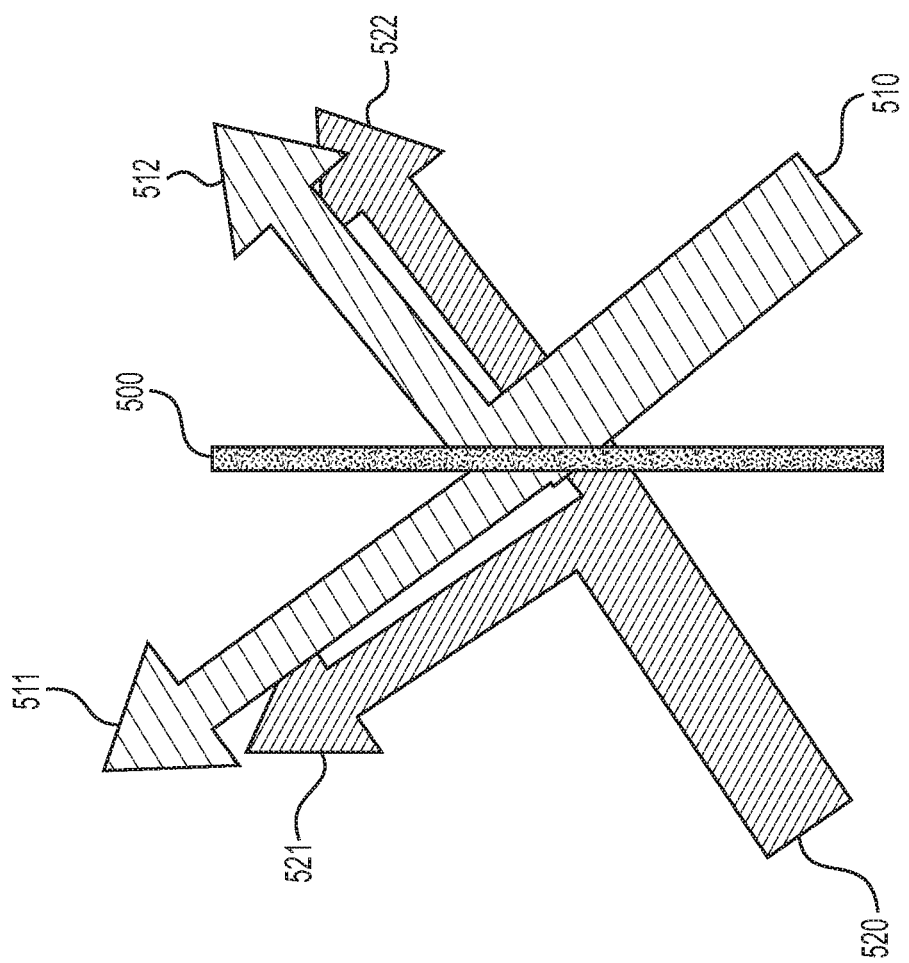
FIG. 5 illustrates an example of beam-splitter layer.
Figure 6A:
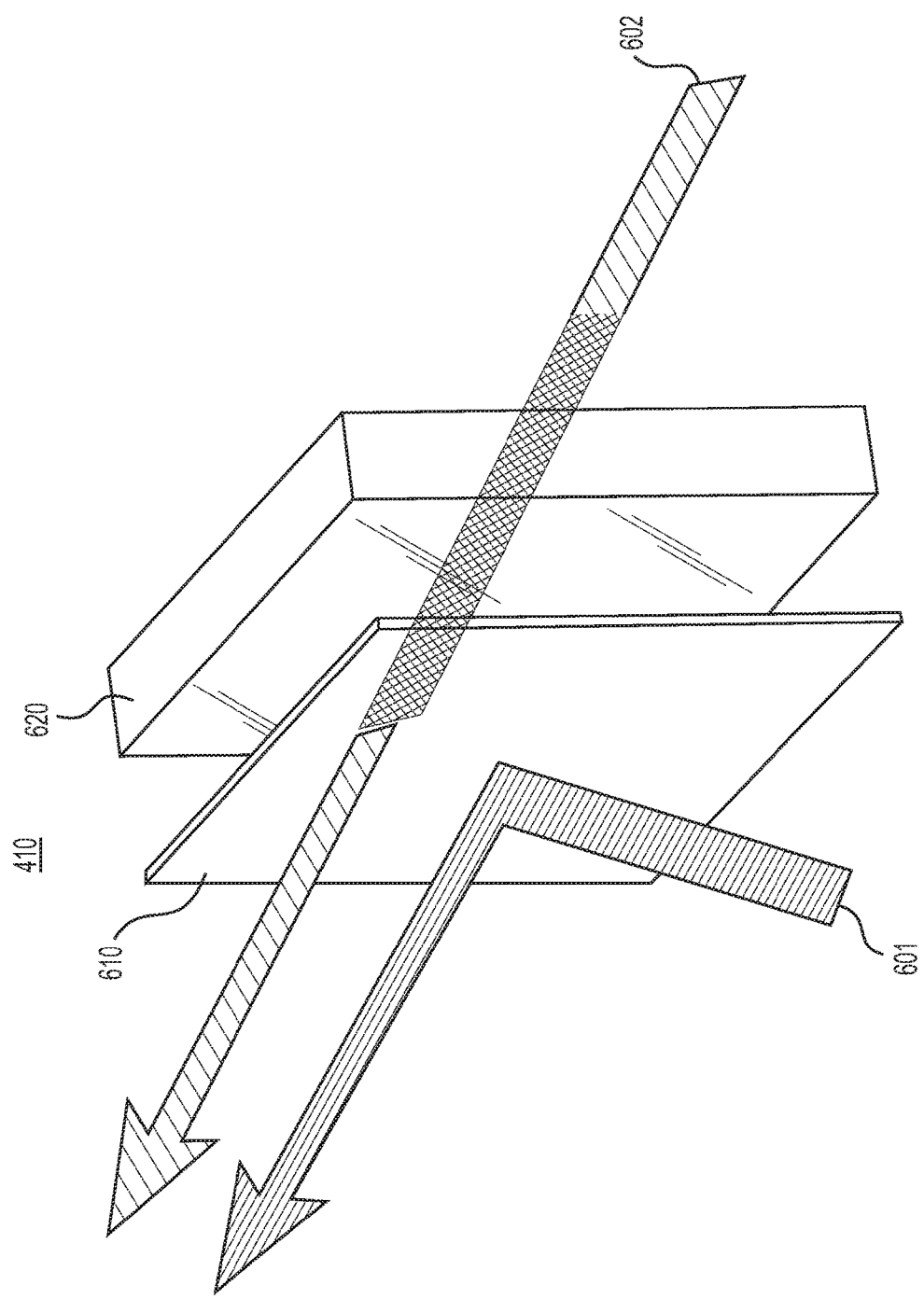
FIGS. 6(a) and (b) illustrate beam splitter devices employed in the HUD's shown in FIGS. 3 and 4.
Figure 6B:
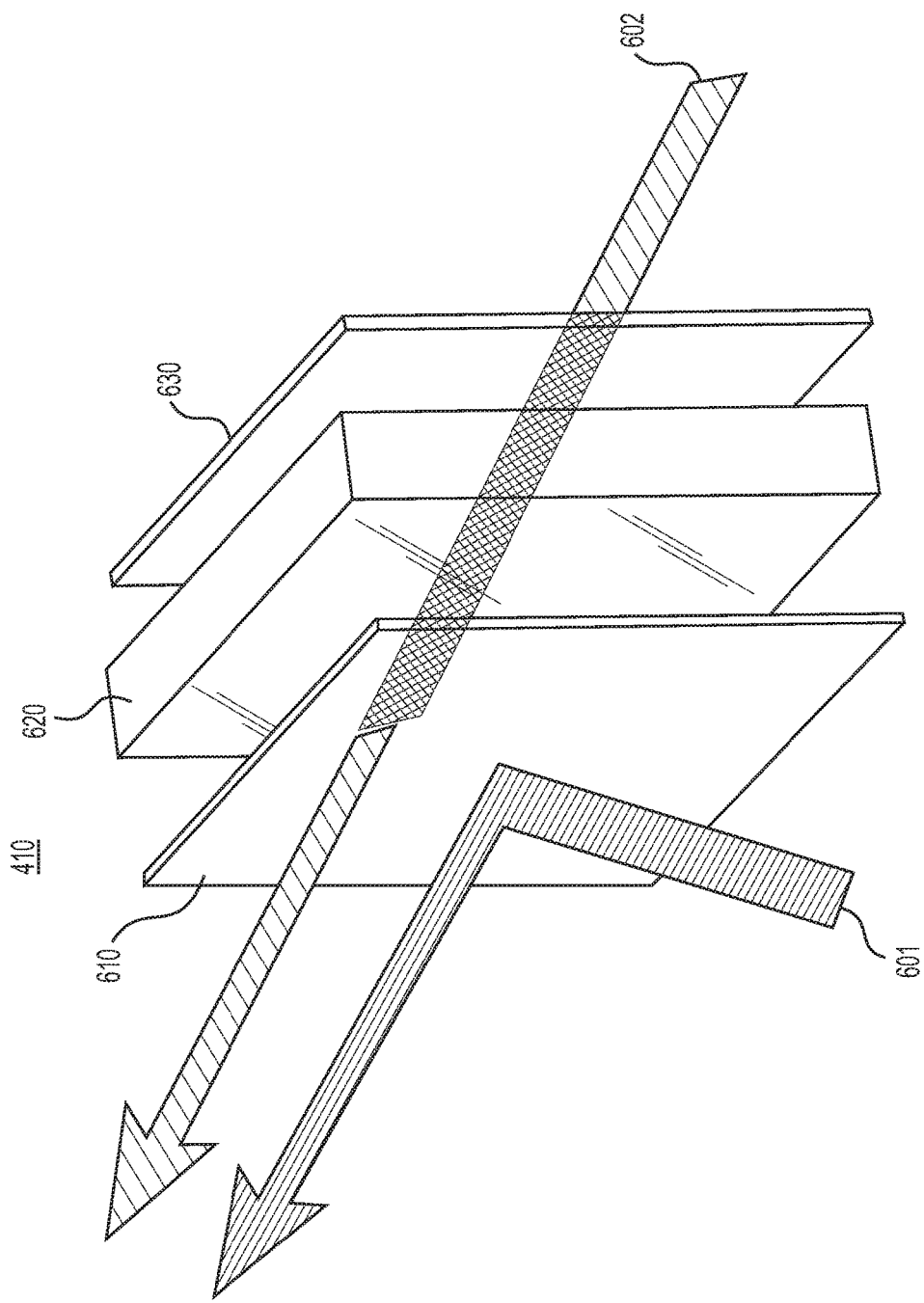
Figure 7B:
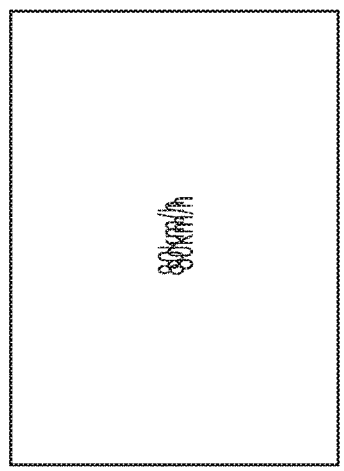
FIGS. 7(a) and (b) illustrate an example of a beam-splitter and the effective display according the systems shown in FIGS. 2-4.
Figure 7A:
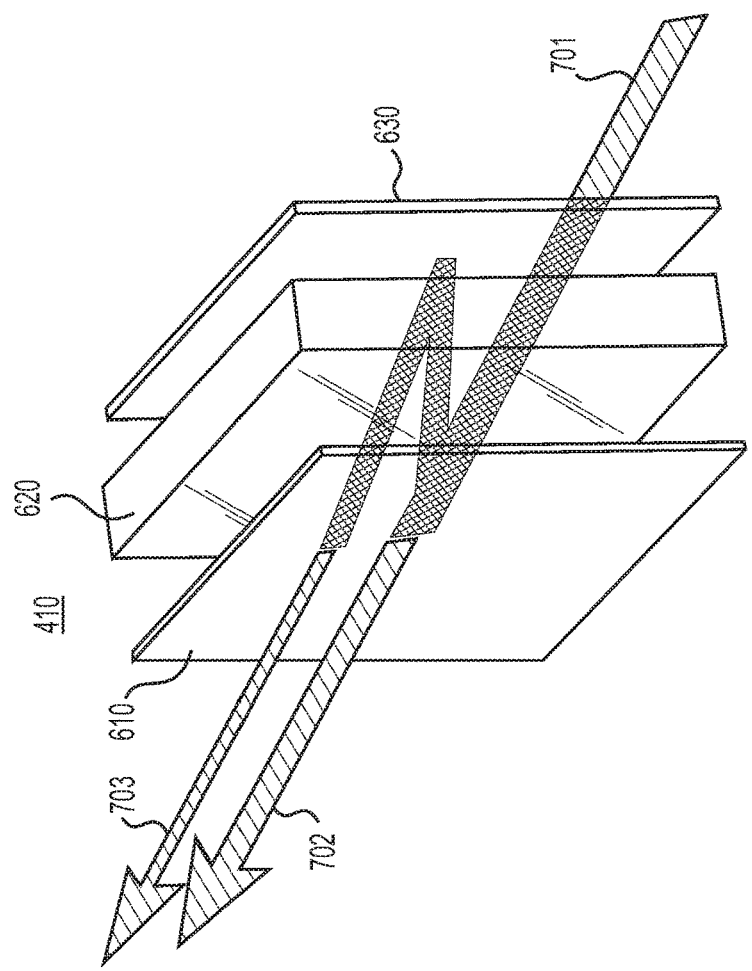

FIGS. 7(a) and (b) illustrate an employment of the beam-splitter 410. As shown in FIG. 7(a), the beam-splitter 410 is in the pathway of a light 701. The light 701 may be generated from a PGU, such as PGU 220 shown in FIGS. 2-4. As light 701 propagates through layers 610-630, some of the light is reflected backwards through the reflective properties associated with the back surface of the reflective coating 610. As the light is reflected backwards to anti-reflective layer 630, an incident beam of light is created. Thus, both light 702 (i.e. the intended light) and incident light 703 are propagated.

As shown in FIG. 7(b), the effective result is the inadvertent display of content twice. This creates multiple representations of the same virtual image, leading to a disorienting display condition for a viewer.

Figure 8B:
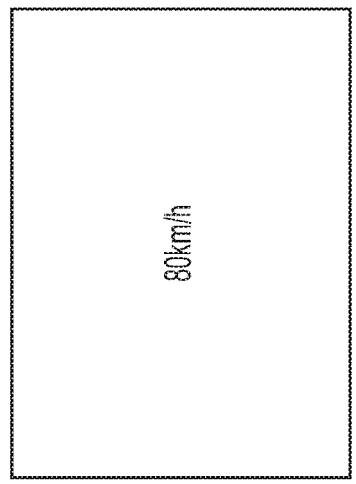
FIGS. 8(a) and (b) illustrate an example of a beam-splitter and the effective display according the exemplary aspects disclosed herein.
Figure 8A:
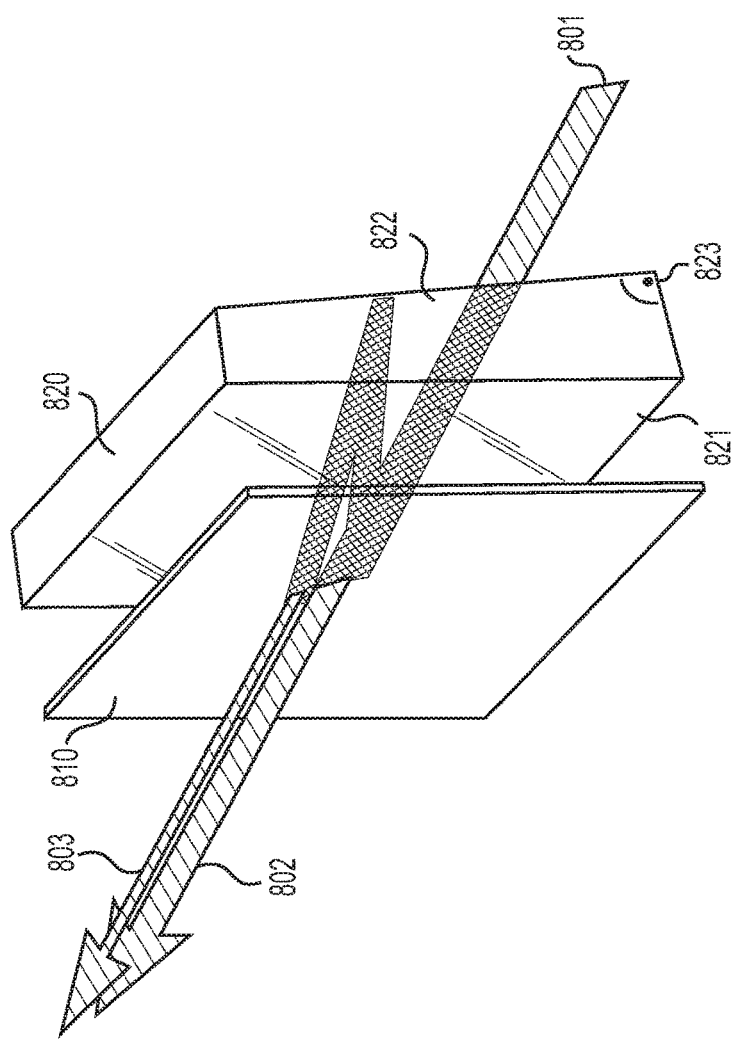
Figure 9:
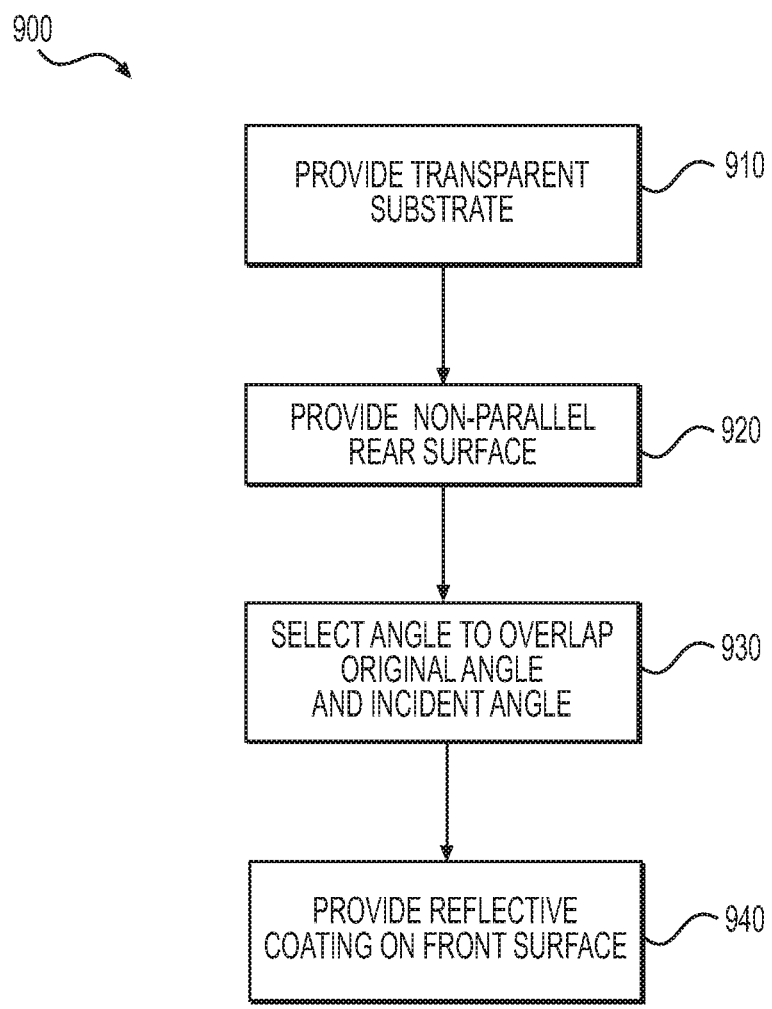
FIG. 9 illustrates a method of implementing a beam-splitter in FIG. 8(a).

FIGS. 8(a) and (b) illustrate a beam-splitter 800 according to an exemplary embodiment disclosed herein. FIG. 9 illustrates a method 900 of implementing the beam-splitter 800.

As shown in FIG. 8(a), a transparent substrate 820 is provided (910). The transparent substrate 820 allows light 801 to propagate through. The transparent substrate may be glass, plastic, or a combination thereof.

The transparent substrate 820 is provided with a front surface 821 and a rear surface 822. As shown in FIG. 8(a), the rear surface 822 is not parallel with front surface 821 (920). In operation 930, the angle 823 introduced is set so that light 801, when reflected back, and then, subsequently reflected forward combines with the original light 801. The angle 823 is chosen based on an original light 802 and an incident light 803 (overlapping). This is shown in FIG. 8(a) as with original light 802 and incident light 803 substantially overlapping.

In operation 940, a reflective coating 820 is applied to the front surface 821 of the transparent substrate. A notable difference and advantage of the construction shown in FIG. 8(a) is the exclusion of an anti-reflective coating layer 630. Thus, implementers of the beam-splitter 800 may achieve cost and space savings through employing the aspects disclosed herein.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

I claim:

1. A head-up display (HUD), comprising:
    a first picture generating unit (PGU) configured to project a first image towards a first mirror, the first mirror being oriented to reflect the first image to a beam-splitter;
    a second PGU configured to project a second image through the beam-splitter, to a second mirror, the second mirror oriented to reflect the first image and the second image to a combiner of the HUD;
    wherein the beam-splitter comprises:
        a transparent substrate defined by a first surface and a second surface, the first surface the second surface opposing each other; and
        a reflective coating applied to the first surface, wherein the first surface and the second surface are not parallel to each other.

2. The head-up display according to claim 1, wherein the transparent substrate is glass.

3. The head-up display according to claim 1, wherein the transparent substrate is plastic.

4. The head-up display according to claim 1, wherein the second surface forms an acute angle with a third surface, the third surface being in-between and extending perpendicular to both the first and second surface.

5. The head-up display according to claim 1, wherein the beam-splitter consists of the transparent substrate and the reflective coating.

* * * * *